United States Patent [19]

Coleman

[11] Patent Number: 4,711,684

[45] Date of Patent: Dec. 8, 1987

[54] METHOD AND APPARATUS FOR USE IN PRODUCING RECONSOLIDATED WOOD PRODUCTS

[75] Inventor: John D. Coleman, Victoria, Australia

[73] Assignee: Commonwealth Scientific and Industrial Research Organization, Australia

[21] Appl. No.: 765,309

[22] PCT Filed: Nov. 23, 1984

[86] PCT No.: PCT/AU84/00241

§ 371 Date: Jul. 23, 1985

§ 102(e) Date: Jul. 23, 1985

[87] PCT Pub. No.: WO85/02367

PCT Pub. Date: Jun. 6, 1985

[30] Foreign Application Priority Data

Nov. 23, 1983 [AU] Australia .............................. PG2514

[51] Int. Cl.⁴ .............................................. B32B 31/00

[52] U.S. Cl. .................................... 156/196; 156/260; 156/264; 156/296; 241/205; 241/206

[58] Field of Search ...................... 156/62.8, 242, 259, 156/260, 264, 296, 349, 196; 225/98, 99; 144/361; 241/205, 206

[56] References Cited

U.S. PATENT DOCUMENTS

| | | | |
|---|---|---|---|
| 773,479 | 10/1904 | Cornell | 241/205 X |
| 4,232,067 | 11/1980 | Coleman | 144/361 X |

FOREIGN PATENT DOCUMENTS

| | | | |
|---|---|---|---|
| 91981 | 10/1983 | European Pat. Off. | 241/205 |

*Primary Examiner*—Robert L. Spruill
*Assistant Examiner*—Steven P. Weihrouch
*Attorney, Agent, or Firm*—Sughrue, Mion, Zinn, Macpeak and Seas

[57] ABSTRACT

Method and apparatus for forming a flexible open lattice work web (14) of naturally interconnected wood strands. A log of wood (10) is passed through a pair of rollers (24, 26) to crush the log and form the web (14). One roller (24) is arranged to be reciprocated axially by a coupling to a piston (40) subjected to hydraulic pressure in a cylinder (42), to facilitate forming the web (14).

23 Claims, 4 Drawing Figures

METHOD AND APPARATUS FOR USE IN PRODUCING RECONSOLIDATED WOOD PRODUCTS

This invention relates to an improved method and apparatus for use in producing reconsolidated wood products.

Our Australian Patent Specification No. 510,845 describes a reconsolidated wood product formed from at least one flexible open lattice work web of naturally interconnected wood strands generally aligned along a common grain direction, a substantial proportion of said strands being substantially discrete but incompletely separated from each other; said web having been consolidated by compression whilst substantially maintaining the wood strands aligned along said common grain direction and said strands being bonded together to hold them in juxtapositions assumed pursuant to said consolidation.

That patent specification also describes a process for forming a reconsolidated wood product, the process comprising the steps of partially rending natural wood to form a flexible open lattice work web of naturally interconnected wood strands which are generally aligned along a common grain direction, a substantial proportion of said strands being substantially discrete but incompletely separated from each other, compressing the web to consolidate the strands whilst maintaining them such as to substantially extend in said original grain direction and bonding said strands together to hold them in juxtapositions assumed pursuant to said consolidation.

The process described above has been found to be generally quite satisfactory. However, the quality of the resultant product is influenced by the quality of the webs used to form the product. In particular, an even web having homogeneously partially separated strands is required for best results. When rolling is employed to produce the webs, the webs may not always be adequately "teased-out", possibly having portions where individual strands are still relatively tightly bundled together, and other portions where the strands are widely separated. Also, there may be a tendency to break an excessive number of individual strands during rolling, thereby weakening the wood structure unnecessarily.

The invention seeks to provide a process and apparatus which facilitates production of good quality webs.

The invention provides a process for partially rending natural wood to form a flexible open lattice work web of naturally interconnected wood strands which are generally aligned along a common grain direction, a substantial proportion of said strands being substantially discrete but incompletely separated from each other, said rending being effected by rolling the natural wood between a pair of rollers, arranged with generally parallel axes, so as to rollingly engage the natural wood from either side, whilst causing repetitive back and forth movements of one said roller relative to the other, said movements being generally parallel to the axes of the rollers.

The invention also provides apparatus for rending natural wood to form natural wood into a flexible open lattice work web of substantially parallel aligned naturally interconnected strands wherein the apparatus comprises a pair of spaced generally parallel axially rotatable rollers and means for effecting repetitive relative back and forth movements of one said roller relative to the other, said movements being generally parallel to the axes of the rollers. Normally, said means is arranged to axially move one of the rollers, the other being substantially fixed axially, but said means may also be arranged to axially move both rollers. In any event the apparatus may be arranged such that the rate of said movement may be varied depending on the surface speed of the rollers occurring in use due to the rotation of the rollers, or on the size and quality of the natural wood, or on the extent to which the wood passing between said rollers has been previously reduced to a flexible open lattice work web. Usually, too, at least one of the rollers is rotationally driven and both rollers may, if desired, be so driven. One or both said rollers may have a series of peripheral grooves extending in planes generally transverse to the direction of the axis of that roller. The grooves may be of width between 1 mm and 10 mm and may be of semi-circular cross-sectional form.

It has been found that the effect of the process and apparatus of this invention is to produce a more effectively "teased-out" web structure, with less strand breakage.

The invention is further described by way of example only with reference to the accompanying drawings in which.

Figure 1:
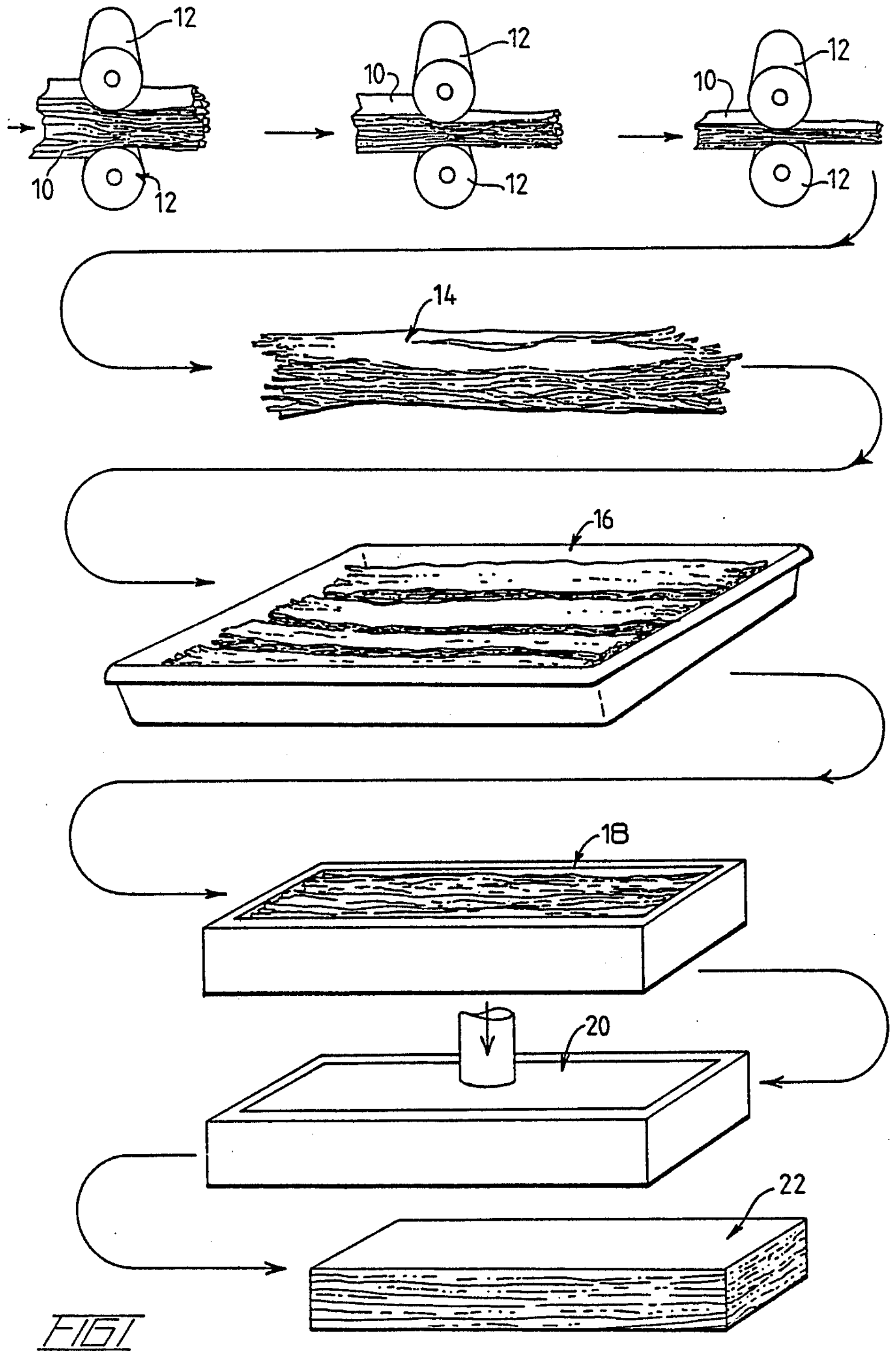
FIG. 1 is a diagram showing the steps in processing reconsolidated wood products in accordance with the invention described in our aforementioned Australian Patent No. 510,845.

Referring firstly to FIG. 1, in the process of Australian Patent Specification No. 510,845 natural wood logs 10 are first partially broken down, being passed successively between rollers 12 of one or more roller pairs to induce cracking and thence progressively open up the log structure to form it into a web of loosely interconnected splinter-like strands (called "splinters" in Patent Specification No. 510,845).

The resultant web, shown at 14 of FIG. 1 is of flexible open lattice work form, individual strands generally maintaining the original grain direction of the wood. Adhesive is then applied to the webs 14 such as by immersion in a suitable liquid adhesive in a bath 16 as shown. After removal of excess adhesive (by means not shown), a plurality of webs 14 are assembled together in a suitable mould 18 such that the individual webs in the assemblage are aligned in a common grain direction. The assemblage of thus aligned webs is then compressed in mould 18 such as by compression between the base of the mould and an upper press element 20 as shown, and the adhesive is cured to form the final product 22.

The formation of the intermediate web 14 is of critical importance in practising the above described process; it is necessary to efficiently produce webs in a fashion such that they possess the required open lattice work structure. It has now been found that webs 14 having the required properties can be produced more efficiently if, during one or more of the rollings of the initial log, a relative reciprocatory movement is introduced as between the rollers of the roller pair. The movement is introduced in the direction parallel to the axes of the two rollers.

Figure 3:
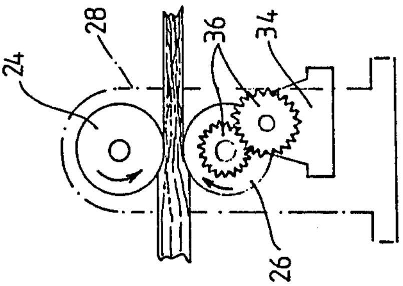
FIG. 3 is a side-elevational view of the apparatus of FIG. 2.
Figure 2:
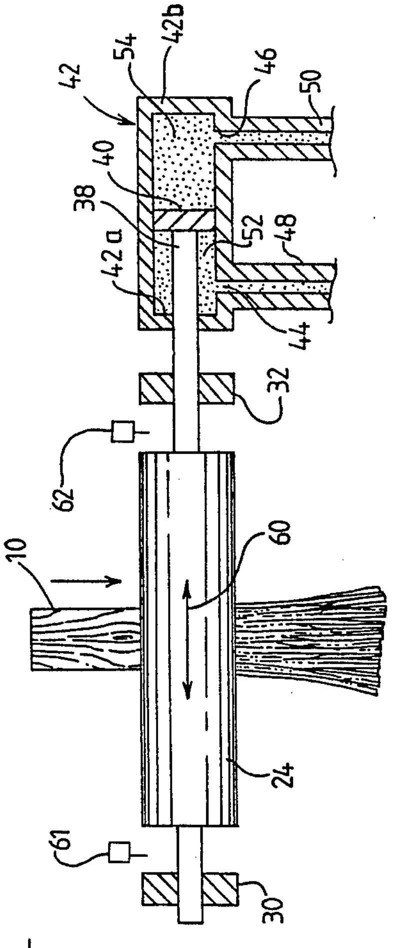
FIG. 2 is a schematic plan view, partly sectioned, of an apparatus constructed in accordance with the present invention.

Reference is now made to FIGS. 2 and 3, which show an apparatus for effecting the described rolling with relative axial movement of rollers of a roller pair. The apparatus comprises two rollers 24, 26 mounted on a frame 28 (shown in FIG. 3 only diagrammatically by phantom lines) for rotation about parallel horizontal axes, roller 24 being positioned above roller 26 with a relatively narrow nip between the rollers. Roller 26 is mounted in bearings (not shown) for rotation about its axis and roller 24 is mounted in bearings 30, 32 for rotation about its axis. The bearings for each of the rollers are carried by the frame 28. A hydraulic motor or other means 34 is provided for driving roller 26 such as via the intermediate gearing 36 shown in FIG. 3.

One end of roller 24 has an outwardly projecting shaft 38 arranged on the axis of the roller, this carrying at its outer end a piston 40 received in a double acting hydraulic cylinder 42. Cylinder 42 has two ports 44, 46 each arranged to permit ingress and egress of hydraulic fluid, on the one hand to and from the space 52 between piston 40 and one end **42*a* of cylinder 42 and on the other hand to and from the space 54 between piston 40 and the other end 42*b* of the cylinder 42. The ports 44, 46 are connected by hydraulic lines 48, 50 to valves and thence to a supply of pressurized hydraulic fluid (all not shown), the valves being arranged to operate in a manner known per se to cyclically apply hydraulic fluid via port 44 to the aforementioned space 52 whilst exhausting it from space 54 via port 46 and thence to apply hydraulic fluid to the space 54 via port 46 whilst exhausting it from space 52 via port 44. In this manner, opposite sides of the piston 40 are repetitively and in alternating fashion subjected to hydraulic pressure to cause the piston 40 to execute to and fro linear reciprocatory movements relative to cylinder 42. Correspondingly, under such movement, the roller 24 is axially moved to and fro in the direction indicated by the arrow 60 in FIG. 2. The reciprocatory motion of the roller 24 is generally continuous but the system may be arranged to provide a momentary pause in the reciprocatory motion when roller 24 reaches the extremities of its travel, i.e. whenever the piston 40 reaches an end of its stroke in hydraulic cylinder 42**.

As shown in FIG. 2, microswitches 61, 62 are provided for effecting control of the reciprocation of roller 24. These are mounted on support frame 28 such that they are alternately actuated by roller 24 as the latter approaches the extremities of its axial travel in direction 60. An electronic control unit (not shown) senses the opening and closing of microswitches 61, 62 and in turn activates solenoid valves (not shown) in hydraulic lines 48, 50 to control the flow of pressurized hydraulic fluid to and from spaces 52 and 54 in cylinder 42. Thus when roller 24 actuates microswitch 61 a solenoid valve is opened to permit inflow of pressurized hydraulic fluid into space 52 via hydraulic line 48. Simultaneously a second solenoid valve in line 50 is opened to permit hydraulic fluid to be exhausted from space 54 via line 50.

The amplitude of the reciprocatory motion of roller 24 is determined by the positioning of microswitches 61, 62 with respect to the ends of roller 24 and may be varied from a relatively small value up to a maximum corresponding to the full length of the stroke that piston 40 can make in cylinder 42.

The control unit also provides means for varying the linear axial speed and rate of reciprocation of roller 24 as, for example, by controlling the rate at which a hydraulic pump (not shown) delivers hydraulic fluid to or exhausts same from spaces 52 and 54 in cylinder 42.

Preferably the control unit is arranged to progressively and smoothly decrease the linear axial speed of roller 24 to zero whenever microswitch 61 or 62 is actuated by roller 24 as the latter approaches the limits of its reciprocatory travel. In this way the generation of shock waves through the sudden closure of valves in the hydraulic system or by contact of the moving roller 24 with fixed mechanical stops can be avoided, with the result that damage to the web and to the individual strands thereof through sudden reversal of the direction of travel of roller 24 is minimized.

It has been found that when passing a log 10 through rollers in which at least the bottom roller 26 is driven by the means 34 and the roller 24 is reciprocated as described, an improved action is effected which results in the efficient formation of webs for use in accordance with the invention.

During the above described operation, the roller 24 will of course be itself rotated due to frictional engagement with the log 10 as it passes through the rollers. It is possible to drive both the rollers 24 and 26 positively, although in practice it has been found generally sufficient to drive only either one. It has also been found sufficient to reciprocate the roller 24 although reciprocation of both rollers could also be effected. The rate of reciprocation is not unduly critical, although it should be set appropriately in accordance with factors such as the log size and quality, prevailing nip gap, and the extent to which the log has been previously reduced to a web. However, rates in the range 10 cycles to 50 cycles per minute have been found to be satisfactory. Similarly, a linear axial speed between about 5 and 100 m/min has been found satisfactory.

As indicated previously it is usually necessary to pass the log 10 several times through a pair of rollers. After each rolling, the gap between the rollers is usually decreased to progressively decrease the rolled thickness of the wood strand bundle derived from the log 10. In practice, this may be effected by repetitive passings through the same pair of rollers in the same direction or by reversing the rolling direction for each passage. Alternatively an in-line rolling operation may be set up where the log 10 is passed successively through a number of pairs of rollers arranged one after the other. In either case, the relative reciprocation of rollers in a roller pair need not necessarily be effected during each rolling but could be effected at selected ones. In particular, it has been found that, frequently, it is not necessary to effect reciprocation of a roller such as roller 24 during the first rolling of the log 10.

The amplitude of reciprocation of the reciprocated roller or rollers is also best established by trial and error in accordance with factors such as the age, size and species of log being processed, and the extent to which the log has previously been reduced to a web. However, for many practical situations an amplitude of the order of 40 to 200 mm may be employed. If the amplitude is too great or the speed of reciprocation too great, there will be an overly great spreading action as between individual strands of the web being formed and this may cause degradation of the resultant web and hence of the end product formed therefrom. In the case where more than one set of roller pairs is employed for successive processing and where the distance between successive sets of roller pairs is less than the length of logs being processed particular care is necessary in selecting the amplitudes if rollers of each successive set are reciprocated since excessive deflective action on the wood may occur due to the possibility that, for example, the first set of rollers subjects the wood to motion with its movable roller in one direction across the wood grain direction whilst the second entered one causes oppositely directed movement or restricts rotational movement of the wood. In such circumstances the tensile stresses thus set up in the wood may cause breakage of the strands. This difficulty can be avoided by appropriate adjustment in surface speed between adjacent sets of rollers, and in practice it has been found possible to select amplitudes of movement which give satisfactory results.

In arrangements where successive sets of roller pairs are employed, with the spacing between adjacent pairs being less than the length of logs being processed, it has been found advantageous in some instances to provide that the rollers in the first reached pair of two successive roller pairs are rotated at a speed such that the surface speed of said first reached rollers is greater than the surface speed of the rollers in the second reached one of said two successive pairs. For example, the first pair may be rotated at about 10 rpm and the second rotated at about 9 rpm which, for pairs of rollers of 300 mm diameter, gives corresponding roller surface speeds of about 9.4 and 8.5 meters per minute respectively. Such surface speed differential need not, generally, exceed 10 percent. A surface speed differential between successive pairs of rollers may be provided as between each successive pair or only between some of the pairs. Such a speed differential in the early stages of rending promotes splitting of the log, whereas in the later stages it prevents undue tensile stress being applied to the strands due to the sideways displacement of the strands resulting from the action of the reciprocating rolls.

Figure 4:
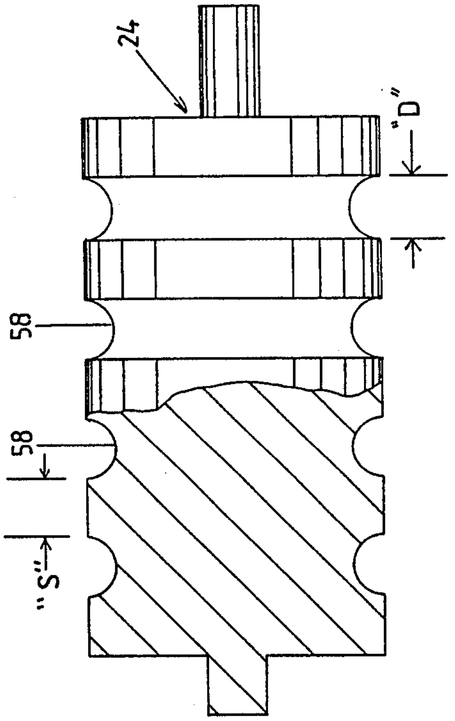
FIG. 4 is an enlarged partly sectioned side view of one roller of the apparatus of FIG. 2.

It has further been found that the improved action caused by the described reciprocatory movement of a roller can be enhanced by proper selection of the surface finish of one or both of the rollers of one or more roller pairs employed in the rolling operation. For example, rubber covered rollers may be used when rolling very finely teased material so as to minimize the risk of damaging the material. The use of pneumatic rollers is advantageous when it is desired to spread finely teased material with minimal damage thereto. More particularly, one roller 24 or more preferably both rollers 24, 26 may be formed with a series of circumferential grooves arranged at equally spaced distances along the axial length of the roller. Such grooves are shown at 58 in FIG. 4 being of part circular configuration. For a roller of diameter 300 mm it has been found that grooves may be such that the dimension "D" indicated in FIG. 4, being the width of the grooves, may be in the range 1 to 10 mm whilst the spacing "S" between adjacent grooves may be 4 mm. In general the width, cross sectional form and spacing of the grooves in one or both of the rollers in any roller pair are selected in relation to the degree of reduction desired during passage of the wood through the roller pair.

The described arrangement has been advanced merely by way of explanation and many modifications may be made thereto within the scope of the appended claims.

I claim:

1. A process for forming a flexible open lattice work web of naturally interconnected wood strands which are generally aligned along a common grain direction with a substantial portion of said strands being substantially discrete but incompletely separated from each other comprising passing natural wood between a pair of rotating rollers the axes of which are disposed substantially parallel to each other so as to rollingly engage and rend the natural wood while simultaneously reciprocating at least one of said rollers relative to the other roller in a direction substantially parallel to the axes of said rollers to further spread the lattice work web without breaking said interconnected wood strands and damping the reciprocating movement of at least one of said rollers towards the end of each reciprocating movement to prevent damage to the web and the individual strands thereof.

2. A process as set forth in claim 1 wherein at least one of said rollers is provided with peripheral grooves.

3. A process as set forth in claim 1 wherein said rollers are axially reciprocated one relative to the other at a rate between ten and fifty cycles per minute.

4. A process as set forth in claim 1 wherein said rollers have a reciprocating amplitude in the range of 40 to 200 mm.

5. A process as set forth in claim 1 wherein said rollers are relatively reciprocated at a relative axial speed of between five and one hundred meters per minute.

6. A process as set forth in claim 1 wherein said rollers are axially reciprocated one relative to the other with no relative axial motion occurring for a short time period at each extremity of movement.

7. A process as set forth in claim 1 wherein at least one of said rollers is covered with rubber.

8. A process as set forth in claim 1 wherein at least one of said rollers is a pneumatic roller.

9. A process as set forth in claim 1 further comprising passing said natural wood through a second pair of rollers wherein the first mentioned pair of rollers has a peripheral speed greater than the peripheral speed of said second pair of rollers.

10. A process as set forth in claim 9 wherein the peripheral speed of said second pair of rollers is up to ten percent less than the peripheral speed of said first mentioned pair of rollers.

11. A process as set forth in claim 1 further comprising compressing and bonding said web to form a reconsolidated wood product.

12. Apparatus for rending natural wood to form said natural wood into a flexible open lattice work web of substantially parallel aligned naturally interconnected strands comprising a pair of spaced apart rotatable rollers having substantially parallel axes, first means for rotating said rollers about said axes for engaging and rending said natural wood to form said web and second means for simultaneously reciprocating at least one of said rollers relative to the other of said rollers in a direction substantially parallel to the axes of said rollers to further spread the lattice work web without breaking said interconnected strands wherein said second means for reciprocating at least one of said rollers includes means to progressively and smoothly dampen the movement of said roller towards the end of each reciprocating movement to prevent damage to the web and the strands thereof.

13. Apparatus as set forth in claim 12 wherein said second means is arranged to axially move one of said rollers, the other being substantially fixed against axial movement.

14. Apparatus as set forth in claim 12 wherein said second means is arranged to axially move both rollers relative to each other at an adjustable rate.

15. Apparatus as set forth in claim 12 wherein at least one of said rollers has peripheral grooves disposed in planes generally transverse to said axes.

16. Apparatus as set forth in claim 15 wherein said grooves have a width between 1 mm and 10 mm.

17. Apparatus as set forth in claim 16 wherein said grooves have a semi-circular cross section in form.

18. Apparatus as set forth in claim 12 wherein said rollers are rubber covered.

19. Apparatus as set forth in claim 12 wherein said rollers are pneumatic rollers.

20. Apparatus as set forth in claim 12 wherein said second means for reciprocating at least one of said rollers is effective to produce a momentary pause at the extreme position of said roller.

21. Apparatus as set forth in claim 12 further comprising a second pair of rollers disposed in line with said mentioned pair of rollers whereby said natural wood may be successively passed through two pairs of rollers and further comprising additional means for rotating said second pair of rollers with the peripheral speed of said first mentioned pair of rollers being greater than the peripheral speed of said second pair of rollers.

22. Apparatus as set forth in claim 12 wherein said first means for rotating said first mentioned rollers rotates said first mentioned rollers at a first peripheral speed and said second means for rotating said second pair of rollers rotates said second pair of rollers at a second peripheral speed up to ten percent less than said first peripheral speed.

23. Apparatus as set forth in claim 12 further comprising means for compressing and bonding said web to form a reconsolidated wood product.

* * * * *